United States Patent [19]

Lao

[11] 4,384,409

[45] May 24, 1983

[54] SURFACE ACOUSTIC WAVE GYROSCOPE

[75] Inventor: Binneg Y. Lao, Rancho Palos Verdes, Calif.

[73] Assignee: The Bendix Corporation, Southfield, Mich.

[21] Appl. No.: 195,027

[22] Filed: Oct. 18, 1980

[51] Int. Cl.³ .............................................. G01P 3/44
[52] U.S. Cl. ........................................ 33/318; 73/505; 310/313 R
[58] Field of Search ............................ 33/318; 73/505; 310/313 R

[56] References Cited

U.S. PATENT DOCUMENTS

| | | | |
|---|---|---|---|
| 3,352,162 | 11/1967 | Hart | 73/505 |
| 3,395,270 | 7/1968 | Speller | 73/505 X |
| 3,491,453 | 1/1970 | Vergoz | |
| 3,910,373 | 10/1975 | Newburgh et al. | 73/505 |
| 4,126,047 | 11/1978 | Sethares et al. | 73/505 |
| 4,167,120 | 9/1979 | Shaw et al. | 73/505 |

OTHER PUBLICATIONS

W. M. Macek & D. Davis Jr., "Rotation Rate Sensing With Traveling-Wave Ring Lasers", Applied Physics Letters, vol. 2, No. 3, Feb. 1963.
V. Vali & W. Shorthill, "Ring Interferometer 950 m Long", Applied Optics, vol. 16, No. 2, Feb. 1977, p. 290.
S. Ezekiel & S. R. Balsamo, "Passive Ring Resonator Laser Gyroscope", Applied Physics Letters, vol. 30, No. 9, May 1977, p. 478.

Primary Examiner—William D. Martin, Jr.
Attorney, Agent, or Firm—James R. Ignatowski; Russel C. Wells

[57] ABSTRACT

A surface acoustic wave gyroscope which detects a change in the propagation velocity of a surface acoustic wave as a function of the rotational velocity of a medium on whose surface the acoustic wave is propogated, is disclosed. In a first embodiment using a fixed frequency oscillator to generate the surface acoustic wave, the change in the propagation velocity is detected as a phase shift between the generated and detected waves. In an alternate embodiment the detected surface acoustic wave is used as a feedback signal to an amplifier to form an oscillator whose frequency varies as a function of the surface waves propagation velocity. In the preferred embodiment, two surface acoustic waves are generated in opposite directions about the cylindrical surface of a substrate.

39 Claims, 10 Drawing Figures

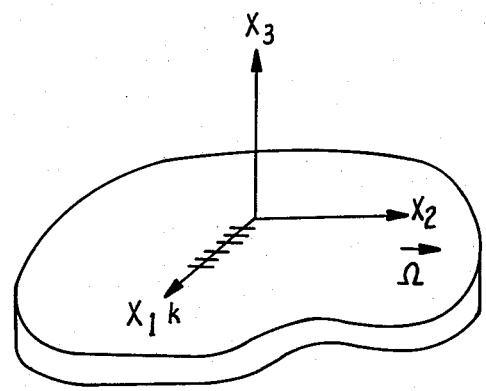
*Fig-1*
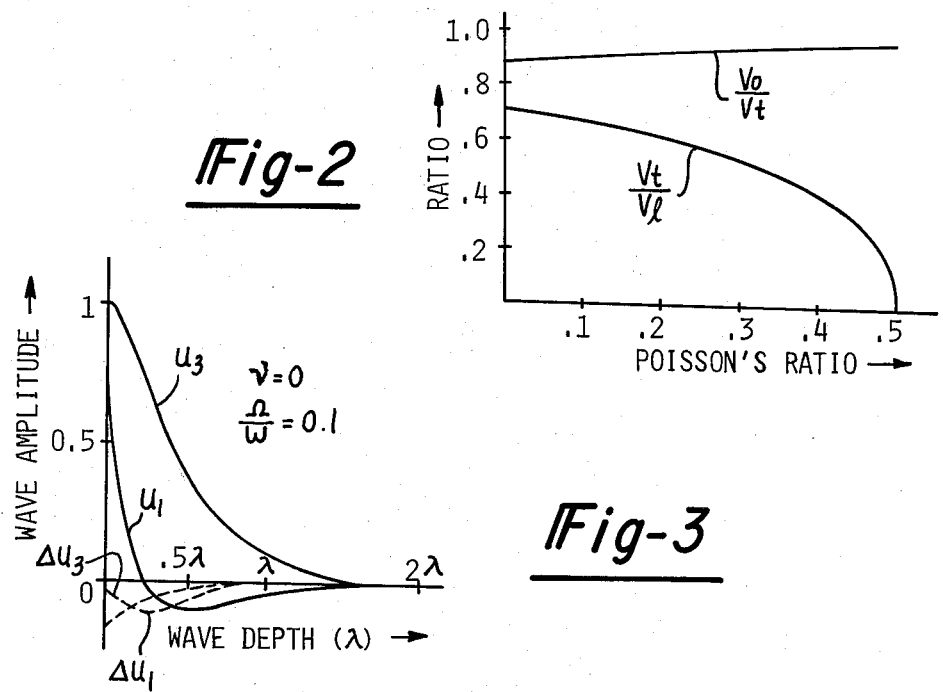
*Fig-2*
*Fig-3*
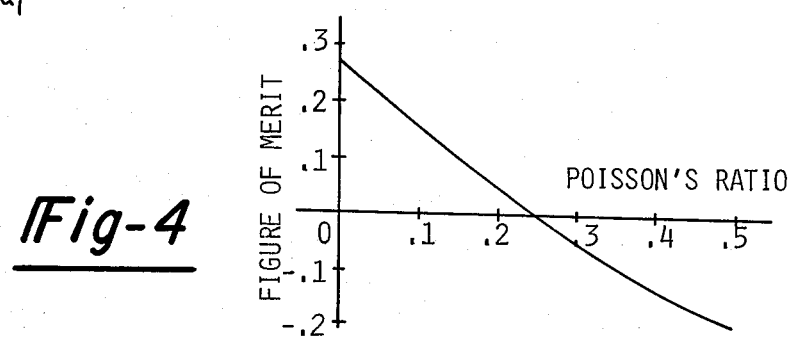
*Fig-4*

4,384,409

SURFACE ACOUSTIC WAVE GYROSCOPE

BACKGROUND OF THE INVENTION

1. Field of the Invention

The invention is related to the field of gyroscopes and in particular to a gyroscope measuring a rotational rate as a function of the change in the propagation velocity of a surface acoustic wave.

2. Prior Art

Optical gyros which measure rotational rates as a function of the change in the length of an optical path are well known in the art. Examples of such optical gyroscopes are the ring gyro as disclosed by W. Macek and D. Davis in the publication "Applied Physics Letters," Volume 2, 1963, page 67, the fiber optic gyro as disclosed by V. Vali and R. Shorthill in the publication "Applied Optics," Volume 16, 1977, page 290 and the passive ring gyro as disclosed by S. Ezekiel and S. R. Balsamo in the publication "Applied Physics Letters," Volume 30, 1977, page 478. The operation of these optical gyroscopes utilize the fact that light travels at a constant velocity in an inertial frame of reference and the rotation of the gyro causes a change in the length of the light path between the source and the detector. Surface acoustic waves exhibit many of the properties of light waves; however, the velocity of the acoustic waves is not a constant in the inertial frame of reference. Therefore, one has to look elsewhere for a viable mechanism of the acoustic waves which can be used to measure the rotational rate of an inertial frame of reference. The disclosed invention is a surface acoustic wave (SAW) gyroscope which detects the effect of rotation on the propogation velocity of the surface acoustic wave.

SUMMARY OF THE INVENTION

The surface acoustic wave gyroscope comprises generating at least one surface acoustic wave on a surface of a substrate with particle motion in a plane normal to an axis of rotation displaced from said surface, detecting said surface wave at a point on the surface of the substrate remote from the location at which the surface wave is generated to generate a signal indicative of the propagation velocity of the surface wave, and computing from a change in the propogation velocity of the surface wave a first signal indicative of the direction i.e. clockwise or counter clockwise, and a second signal indicative of the rotational rate or velocity of the substrate about the axis of rotation. In the preferred embodiment, two surface acoustic waves are generated traversing the surface of the cylindrical substrate in opposite directions. Rotation of the cylindrical substrate causes the propagation velocities of the two acoustic waves to change in opposite directions producing a detectable difference between the two waves. This difference is used to generate signals indicative of the rotational velocity and the direction of rotation of the substrate. The difference may also be used to generate signals indicative of the total angular displacement of the substrate and the direction of said total angular displacement.

The object of the invention is a gyroscope in which the propagation velocity of a surface acoustic wave is detected to generate signals indicative of the rotational direction and rate of an object. Another object of the invention is a gyro in which the surface acoustic wave is propagated along the surface of a substrate rotable about an axis normal to the propagation direction of the surface acoustic wave and displaced from said surface. A further object of the invention is a gyroscope in which two surface acoustic waves are propogated in opposite directions about the circumference of a cylindrical substrate and the velocity difference between the two waves being indicative of the rotational direction and velocity of the substrate. Another object is a surface acoustic wave gyroscope in which two surface acoustic waves are propagated in opposite directions around a cylindrical substrate and the difference between the phases of the two waves used to generate signals indicative of the displacement and direction of the displacement of the substrate from an initial position.

These and other objects of the invention will become apparent from reading the detailed description of the invention and the accompanying drawings.

BRIEF DESCRIPTION OF THE FIGURES

FIG. 1 shows the coordinate system used in discussing the theory of operation.

FIG. 2 is a graph showing the ratio of the propogations velocities as a function of Poisson's Ratio.

FIG. 3 is a graph showing the change in the surface and bulk wave amplitude as a function of wave depth $V=0$.

FIG. 4 is a graph showing the "Figure of Merit" as a function of Poisson's Ratio.

DETAILED DESCRIPTION OF THE INVENTION

Figure 5:
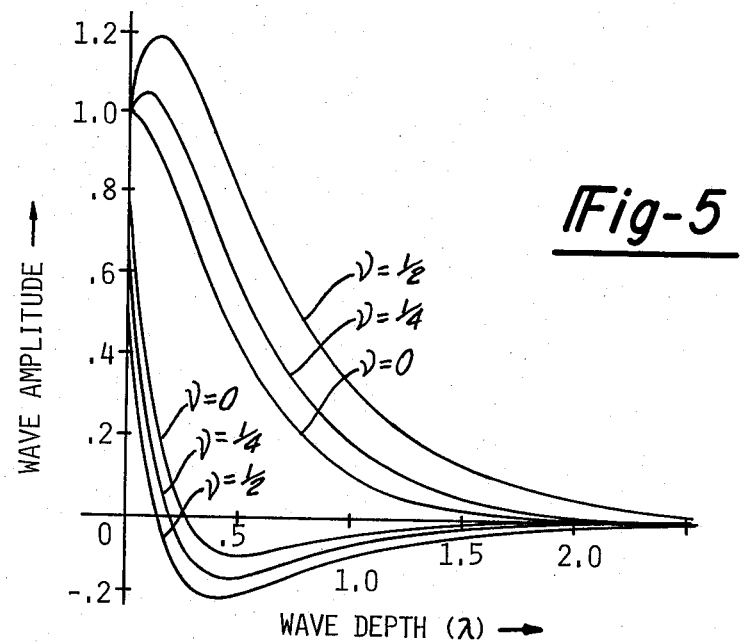
FIG. 5 is a graph shown the change in the surface and bulk wave amplitudes as a function of wave depth for $v=\frac{1}{4}$ and $v=\frac{1}{2}$.

The operation of the disclosed surface acoustic wave gyroscope is based on the principle that the rotation of a medium will cause the velocity of a surface acoustic wave propagation about its peripheral surface to change. This change in the propagation velocity of the surface acoustic wave is approximately linearly proportional to the rotational rate and the Poisson's ratio of the medium and can be used to measure the rotation of the medium.

THEORY OF OPERATING PRINCIPLE

The effect of rotation in surface acoustic waves is derived theoretically in a perturbation treatment of the Coriolis force for an isotropic medium.

The components of the position vector of a point in a rotating medium are represented by $X_i$ while the displacement vector of the point due to wave motion is denoted by $U_i$. As given by G. W. Farwell in Topics in Applied Physcis Volume 24, 1978, page 13, page 101, the equation for the motion of a surface acoustic wave can be expressed as:

$$-\rho \frac{\partial U_i}{\partial t_i} + C_{ijkl} \frac{\partial^2 U_k}{\partial x_j \partial x_l} - 2\rho \epsilon_{ijk} \Omega_j \frac{\partial U_k}{\partial t} - \rho(\Omega_i \Omega_j U_j - \Omega_j \Omega_j U_i) = 0 \quad (1)$$

where
- $\rho$ is the density of the material;
- $C_{ijkl}$ is the elastic tensor;
- $\epsilon_{ijk}$ is the Levi-Civita density; and $\Omega_j$ is the component of a rotational rate vector along the j axis. The first term on the right side of Eq. (1) is the inertial term and the second term is the elastic term. The third term $\rho \Omega_i \Omega_j U_j$ is the Coriolis force term and the fourth term $\rho \Omega_j \Omega_j U_i$ is the centrifugal force term. The ratio of the fourth term to the third term is proportional to $\Omega/\omega$ where $\omega$ is the frequency of the surface acoustic wave which is normally much higher than the rotation rate $\Omega$. Additionally, the fourth term is proportional to $\Omega_j^2$ and may be neglected because we seek only linear effects.

For an isotropic media, the elastic tensor C can be written as:

$$C = \begin{pmatrix} C_{11} & C_{12} & C_{12} & & & \\ C_{12} & C_{11} & C_{12} & & 0 & \\ C_{12} & C_{12} & C_{11} & & & \\ & & & C_{44} & & \\ & 0 & & & C_{44} & \\ & & & & & C_{44} \end{pmatrix} \quad (2)$$

where the abbreviated index notation is used. The three elastic constant in Eq. (2) are related in the following manner:

$$\begin{aligned} C_{11} &= \lambda + 2\mu \\ C_{12} &= \lambda \\ C_{44} &= \mu \\ \nu &= \lambda/2(\lambda + \mu) \end{aligned} \quad (3)$$

where $\lambda$ and $\mu$ are the independent Lame constants and is the Poisson's ratio having a value between 0 and 0.5. Assuming a plane wave solution to Eq. (1) in the form of $$U_j = a_j exp[ik(b_l x_l - Vt)] \quad (4)$$

then, neglecting the centrifugal force term, Eq. (1) reduces to a set of secular equations $$\left( \Gamma_{ik} - \delta_{ik}\rho V^2 - 2i\rho \frac{V}{k} \epsilon_{ijk}\Omega_j \right) a_k = 0 \quad (5)$$

where $$\Gamma_{ik} = \Gamma_{ki} = b_j b_l C_{ijkl} \quad (6)$$

Equation (5) without the third term is the Christoffel equation whose solution is given by Farwell in the above-referenced publication. The objective is to obtain solutions to Eq. (5) for finite $\Omega_i/k$ which is small compared to wave velocity V so that the third term can be treated as a perturbation.

The coordinate system for the surface acoustic wave under discussion is shown in FIG. 1 where $X_1$ is the direction of propagation of the surface wave; the $X_3$ is a direction normal to the surface and the rotation rate vector $\vec{\Omega}$ is along the $X_2$-direction. The directional cosines $b_1$ in Eq. (4) are defined by:

$$b_1 = 1; \; b_2 = 0; \; b_3 = b$$

where $b_3$ is expected to be complex for a surface wave so that the wave amplitude decays exponentially away from the surface. Eq. (5) then reduces to:

$$\begin{pmatrix} V_l^2 + V_t^2 b^2 & 0 & (V_l^2 - V_t^2)b - 2iV^2\frac{\Omega}{\omega} \\ 0 & V_t^2(1 + b^2) & 0 \\ (V_l^2 - V_t^2)b + 2iV^2\frac{\Omega}{\omega} & 0 & V_l^2 b^2 + V_t^2 \end{pmatrix} \alpha = V_\alpha^2 \quad (8)$$

where $V_l$ is the longitudinal bulk wave velocity, $V_t$ the shear bulk wave velocity, V the surface wave velocity to be determined and $\omega$ the frequency of the surface wave. These terms are defined as follows:

$$\begin{aligned} V_l^2 &= C_{11}/\rho \\ V_t^2 &= C_{44}/\rho \\ \omega &= V \cdot k \end{aligned}$$

By setting the determinant in Eq. (8) to zero, solutions for b in terms of the surface acoustic wave velocity V are as follows:

$$b^{(1)} = -i\left[ 1 - \frac{V^2}{V_t^2} + 4\delta^2 \left[ \frac{V_t^2}{V^2}\left(\frac{V_t^2}{V^2} - 1\right) - \frac{V_t^2}{V^2}\left(\frac{V_t^2}{V^2} - 1\right) \right]^{-1} \right]^{\frac{1}{2}} \quad (10)$$

$$b^{(3)} = -i\left[ 1 - \frac{V^2}{V_t^2} - 4\delta^2 \left[ \frac{V_t^2}{V^2}\left(\frac{V_t^2}{V^2} - 1\right) - \frac{V_t^2}{V^2}\left(\frac{V_t^2}{V^2} - 1\right) \right]^{-1} \right]^{\frac{1}{2}}$$

where $$\delta = \frac{\Omega}{\omega}.$$

The above equations are the decay constants for the partial wave solutions. Note that the b's are not perturbed to first order in $\delta$. The eigenvectors for these partial waves are:

$$\alpha^{(1)} = \left\{ i \left[ \left(1 - \frac{V^2}{V_l^2}\right)^{\frac{1}{2}} - 2\delta \frac{V^2}{V_l^2 - V_t^2} \right] \atop 1 \right\} \quad (11)$$

$$\alpha^{(3)} = \left\{ i \left[ \left(1 - \frac{V^2}{V_t^2}\right)^{\frac{1}{2}} + 2\delta \frac{V^2}{V_l^2 - V_t^2} \right] \atop 1 \right\} \quad (3)$$

A surface wave is a linear combination of these two partial wave solutions:

$$U_j = C_n \alpha_j^{(n)} \exp\left[ ik\left( b_1^{(n)} x_l - V_t \right) \right] \quad (12)$$

The contants $C_n$ can be obtained by demanding that the surface wave satisfies the boundary condition:

$$T_{3i} = C_{3ikl} \frac{\partial U_k}{\partial x_l} = 0 \quad (13)$$

at $X_3 = 0$.

Substituting Eq. (12) into Eq. (13) we obtain:

$$H_{ij} C_j = 0 \quad (14)$$

where $$H_{ij} = C_{3ikl} \alpha_k b_l.$$

The solution for the surface wave velocity V obtained by setting the determinant of H to zero are as follows:

$$F(V) = f(V) - \delta P(V) = 0 \quad (15)$$

where $$f(V) = 4 \left(1 - \frac{V^2}{V_l^2}\right)^{\frac{1}{2}} \left(1 - \frac{V^2}{V_t^2}\right)^{\frac{1}{2}} - \left(2 - \frac{V^2}{V_t^2}\right)^2 \text{ and}$$

$$P(V) = \frac{2V^2}{V_l^2 - V_t^2} \left[ \left(1 - \frac{V^2}{V_l^2}\right)^{\frac{1}{2}} \left(4 - \frac{V^2}{V_t^2}\right) - \left(1 - \frac{V^2}{V_t^2}\right)\left(4 - \frac{V^2 V^2}{V_t^4}\right) \right]$$

In the absence of rotation, $\delta = 0$ and Eq. (15) reduces to the familiar Rayleigh equation $f(V_o) = 0$ where $V_o$ is the unperturbed surface acoustic wave velocity. The ratios $V_o/V_t$ and $V_t/V_l$ are plotted as functions of the Poisson's ratio $\nu$ of the medium in FIG. 2. $V_o/V_t$ varies from 0.874 at $\nu=0$, 0.9194 at $\nu=\frac{1}{4}$ to 0.9553 at $\nu=\frac{1}{2}$.

Denoting $\Delta V+$ as the increase in V due to a finite $\delta$, we have to first order in $\delta$ $$\Delta F = 0 = \frac{\partial f}{\partial V}\bigg|_{V=V_o} \Delta V_+ - P(V_o)\delta \quad (16)$$

The $+$ sign for $\Delta V$ indicates wave propagation in the $+X_1$ direction.

Equivalently $$\left(\frac{\Delta V}{V}\right) / \left(\frac{\Omega}{\omega}\right) = P(V_o) / \left[ V_o \cdot \frac{\partial f}{\partial V}\bigg|_{V=V_o} \right] \quad (17)$$

This is the basic result which relates fractional change in the surface acoustic wave velocity to the ratio between the rotation rate $\Omega$ and the surface acoustic wave frequency $\omega$. Equation (17) shows that the velocity of the surface acoustic wave varies linearly with rotation rate changing sign as rotation changes direction.

The amplitude of the surface acoustic wave can be obtain by solving Eq. (14) and substituting back in Eq. (12). To first order in $\delta$ they are:

$$U_1 = A \left[ e^{kLx3} - \frac{2(L - \delta Q)(T + 2\delta Q)}{(1 + T^2 + 2\delta QT)} e^{kTx3} \right] e^{i(kx1 - \omega t)} \quad (18)$$

$$U_3 = iA \left[ (L - 2\delta Q)e^{kLx3} - \frac{2(L - \delta Q)}{(1 + T + 2QT)} e^{kTx3} \right] e^{i(kx1 - \omega t)} \quad (19)$$

where $L = (1 - V_o^2/V_l^2)^{\frac{1}{2}}$
$T = (1 - V_o^2/V_t^2)^{\frac{1}{2}}$
$Q = V_o^2/(V_l^2 - V_t^2)$ and $V_o$ is the unperturbed surface acoustic wave velocity. The change in the wave amplitudes for $\delta = 0.1$ is shown in FIG. 3.

Qualitatively, the dependence of the surface acoustic wave velocity on the rotation rate of the medium can be understood from the following considerations. When a surface acoustic wave is propagating along the $X_1$ axis, then the particle motion near the surface is elliptically polarized in a counter-clockwise fashion. About $\frac{1}{4}$ wavelength into the bulk of the material, the polarization becomes clockwise. This is shown in FIG. 3, where the wave amplitude $U_1$ is plotted as a function of depth. For a rotation vector $\vec{\Omega}$ along the $X_2$ axis, the Coriolis force $-m\vec{\Omega} \times \vec{V}$ is radially inward for the "skin" part and radially outward for the "bulk" part of the surface acoustic wave. If the skin part of the wave dominates, the radially inward force acts similar to an enhancement of the elastic constant so that one expects an increase in the wave velocity. If the bulk part dominates, the wave velocity decreases under rotation.

The "Figure of Merit" $(\Delta V/V_o)/(\Omega/\omega)$ as a function of the Poisson's ratio $\nu$ is plotted in FIG. 4. It varies from about 0.27 for $\nu=0$, zero for $\nu=\frac{1}{4}$ to $-0.198$ for $\nu=\frac{1}{2}$. The sign reversal can be understood by examining the wave amplitude as a function of $\nu$. The wave amplitude plotted for $\nu=0$, $\frac{1}{4}$, and $\frac{1}{2}$ are shown on FIG. 5. As $\nu$ increases the dominant part of the wave goes from the "skin part" over to the "bulk part". Since the two parts have opposite polarizations, the "figure of merit" goes from positive to negative.

IMPLEMENTATION OF THE INVENTION

Figure 6:
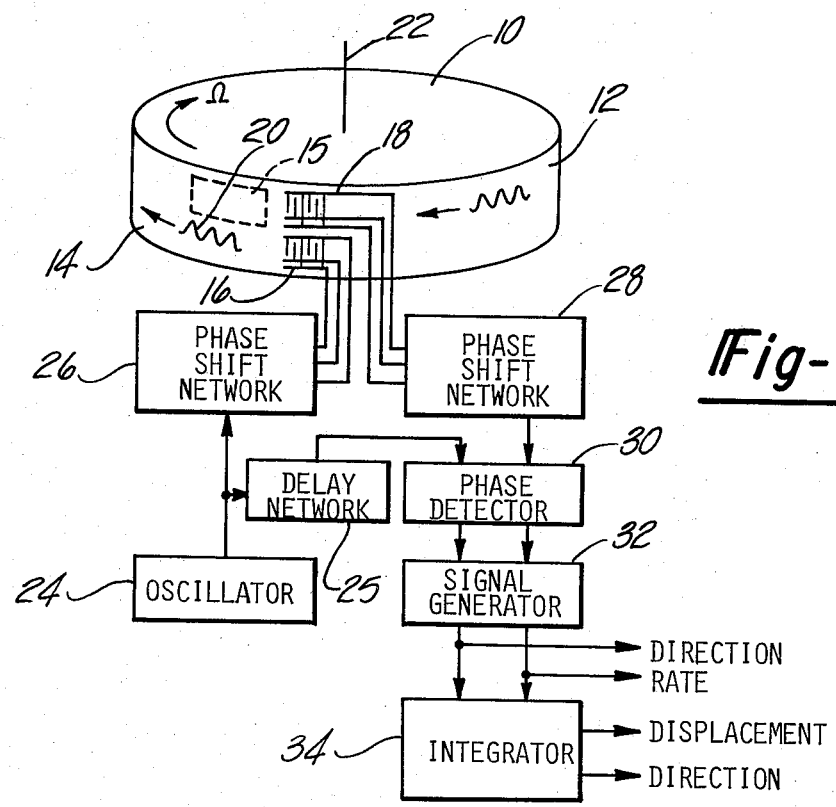
FIG. 6 is a block diagram of a first embodiment of a dual transducer surface acoustic wave gyroscope.

The details of several different embodiments of the surface acoustic wave (SAW) gyroscope are illustrated in FIGS. 6 through 10. Referring first to FIG. 6, the gyroscope comprises a cylindrical substrate 10 made from a thermally stable material such as fused quartz. The cylindrical surface 12 is coated with a thin layer of piezoelectric material 14 such as zinc oxide (ZnO) or lithium niobate ($LiNbO_3$). A pair of vertically offset unidirectional interdigital transducers 16 and 18 are deposited on the surface of the piezoelectric material 14 as shown. Transducer 16 functions as a transmitter generating a surface acoustic wave, illustrated by wave form 20 propagating around the cylindrical surface 12 of the substrate 10 with particle motion in a plane generally normal to the axis 22 of the substrate 10. An area on cylindrical surface 12, to the left of transducer 18 may be coated with a material 15 absorbing the surface acoustic wave after detection by transducer 18.

The interdigital transducer 16 is energized by an oscillator 24 generating an oscillator signal having a frequency.

The oscillator signal is converted to the three phase signal required to energize the unidirectional interdigital transducer 16 by a phase shift network 26. The outputs of the phase shift network 26 are connected to the inputs of interdigital transducer 16 in a conventional manner causing the generated surface acoustic wave to be propagated only in the predetermined direction.

The interdigital transducer 18 functions as a receiver and converts the received surface acoustic wave to a three phase electrical signal. The outputs of transducer 18 are connected to the inputs of a phase shift network 28 which outputs a corresponding signal. The output of oscillator 24 is also connected to a delay network 25 which delays the phase of the oscillator signal so that the delayed oscillator signal will be in phase with the signal detected by transducer 18 when the substrate 12 is not rotating. The outputs of delay network 25 and phase shift network 28 are connected to a phase detector 30 which outputs a phase signal indicative of the phase difference between these two signals. The output of the phase detector 30 is received by the signal generator 32 which generates a first direction signal in response to whether the phase of the signal received from phase shift network 28 leads or lags the phase of the signal received from the oscillator 24. The first direction signal is indicative of the direction which the cylindrical substrate 10 is rotating (i.e. clockwise or counterclockwise). The signal generator 32 also generates a rate signal in response to the magnitude of the phase signal which is indicative of the rotational rate $\Omega$ of the cylindrical substrate 10. The rate signal and first direction signal may also be input to an integrator 34.

Integrator 34 integrates both the rate signal and the direction signal to produce a rotational position or attitude signal indicative of the total angular rotation or displacement $\theta$ of the cylindrical substrate 10 from its initial position, and a second direction signal indicative of the direction of said total angular displacement where $$\theta = \int \Omega dt.$$

The first direction signal received by the integrator 34 is determinative of the direction of rotation such that sequential attitude signals produced by the substrate rotating in the same direction are added while attitude signals produced by opposite rotations of the substrate are subtracted.

The operation of this first embodiment of the surface acoustic wave gyroscope is as follows: Transducer 16, in response to the signal output by oscillator 24 generates a surface acoustic wave 20 which propagates along surface 12 of the cylindrical substrate 10. The orientation of interdigital transducers 16 and 18 permits the surface acoustic wave to be detected by transducer 18. Absorbing material 15 prevents further propagation of the surface acoustic wave. Transducer 18 generates electrical signals on its three sets of interdigital electrodes which are converted to a corresponding signal by phase shift network 28. The phase comparator 20 compares the phase of the signal received from the phase shift network 28 with the phase of the delayed oscillator signal received from the delay network 25.

When the cylindrical substrate is stationary (not rotating) the signal received from the phase shift network 28 is in phase with the signal received from the delay network 25 and no phase signal is generated. Rotation of the cylindrical substrate 10 in a direction increasing the propagation velocity of the surface acoustic wave will cause the phase of the surface acoustic wave detected by transducer 18 to lead the phase of the signal recieved from the delay network. Conversely, rotation of the substrate in the opposite direction will decrease the velocity of the surface acoustic wave causing the phase angle of the signal detected by transducer 18 to lag the phase of the signal received from the delay network 25. The phase angle between the two signals is indicative of the rotational rate $\Omega$ of the substrate 10 while the polarity of the phase signal is determinative of the direction of rotation. It is understood that the phase detector 30 includes logic to accomodate phase differences greater 90° as is known in the art. This permits phase differences in excess of 360° to be accurately measured. The integrator 34 receives both the first direction signal and the rate signal and generates an attitude signal indicative of total angular displacement of the cylindrical substrate from its initial position and a direction signal indicative of the displacement direction of the total angular displacement.

Figure 7:
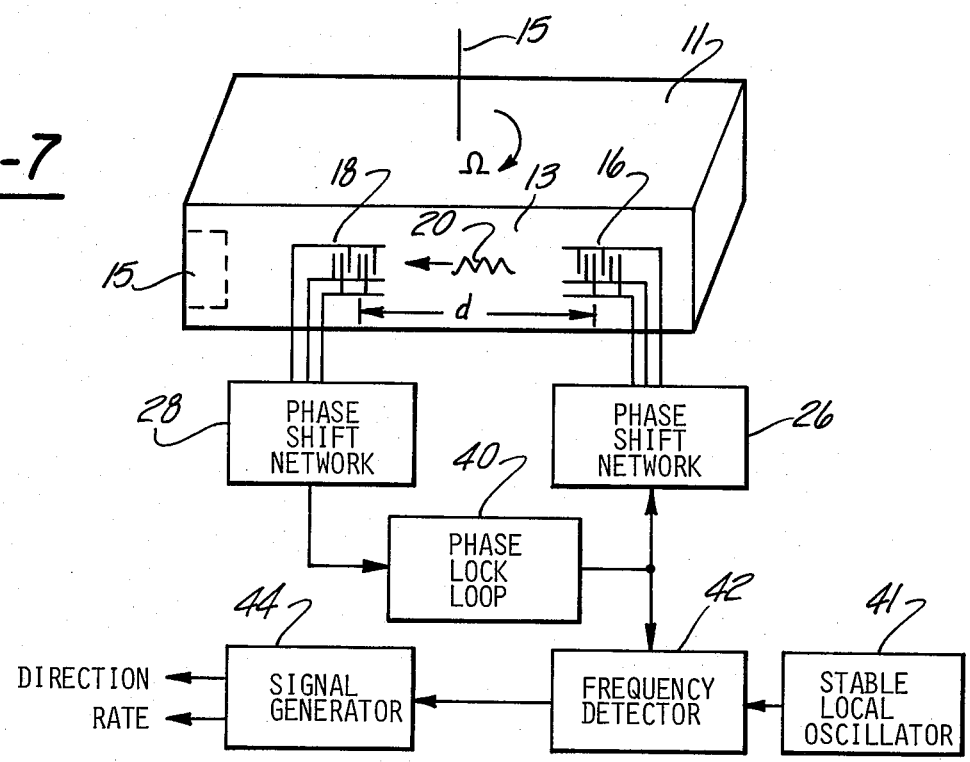
FIG. 7 is a block diagram is an alternate embodiment of the dual transducer surface acoustic wave gyroscope.

Another embodiment of the surface acoustic wave rate gyroscope is illustrated on FIG. 7. In this embodiment the two transducers 16 and 18 are disposed on a flat surface 13 of rectangular substrate 11 separated by a distance "d". The surface 13 is displaced from an axis of rotation 15. The distance "d" is normally selected so that it is a multiple of the wave length $\lambda$ of the surface acoustic wave so that the detected surface acoustic wave is in phase with the generated wave. In a similar manner transducers 16 and 18 have associated phase shift networks 26 and 28 respectively. The output of the phase shift network 28 is connected to the input of a phase locked loop circuit 40 of a conventional design having its output connected to the input of phase shift network 26 and to a frequency detector 42. The frequency detector 42 may be a frequency demodulator, such as found in f.m. radio or television circuits which produces a d.c. output indicative of the frequency of the received signal or may be a mixer of convential design which mixes the received signal with a reference signal received from a stable local oscillator 41 having a frequency equal to the frequency output by the phase locked loop circuit when the substrate 11 is not rotating. In this latter embodiment of the frequency detector the output would be a first signal having a frequency indicative of the difference between the received signal and the referenced signal and second signal indicative of whether the frequency of the received signal is greater or less than the reference signal.

The output or outputs of the frequency detector are received by a signal generator 44 which converts the received signals to a direction signal indicative of the direction in which the substrate 11 is rotating and a rate signal indicative of the rate at which the substrate 11 is rotating. Although it is not shown, it is obvious that the embodiment of FIG. 7 may include and integrator such as integrator 34 of FIG. 6 to produce an attitude signal indicative of the total angular displace of the substrate 11 from its initial position and a direction signal indicative of the direction of said total angular displacement in response to the direction and rate signals.

The operation of this circuit is as follows. The phase shift network 26 and transducer 16 receive the output of the phase lock loop circuit 40 and produce a surface acoustic wave which traverses across surface 13 of substrate 11 to transducer 18. The output of transducer 18 is converted by phase shift network 28 to produce a feedback signal to the phase locked loop circuit 40. As is known in the art, the phase lock loop circuit will respond to the feedback signal received from phase shift network 28 and oscillate at a frequency which will produce a predetermined phase difference between phase of its output signal and the phase of the feedback signal. As previously discussed, the phase of the surface acoustic wave detected by transducer 18 is dependant upon the propagation velocity of the wave itself which in turn is directly related to the rotational rate of the substrate 11. Thus when the substrate 11 is not rotating, the phase lock loop circuit will oscillate at a fixed frequency. Rotating the substrate 11 in a first direction will change the phase of the detected surface acoustic wave causing the frequency of the phase lock loop circuit to increase. Rotating the substrate in the opposite direction will correspondingly cause the frequency of the phase lock loop circuit 40 to decrease. The oscillation frequency of the phase lock loop circuit therefore will be indicative of the direction and rate of rotation of the substrate 11. Obviously the substrate 11 could equally be cylindrical in shape as substrate 10 in FIG. 6 and the distance "d" be a circumferential distance along the surface of the cylinder without affecting the operation of the gyroscope. Conversely the two transducers 16 and 18 of FIG. 6 may be disposed on a flat surface as illustrated in FIG. 7.

Figure 8:
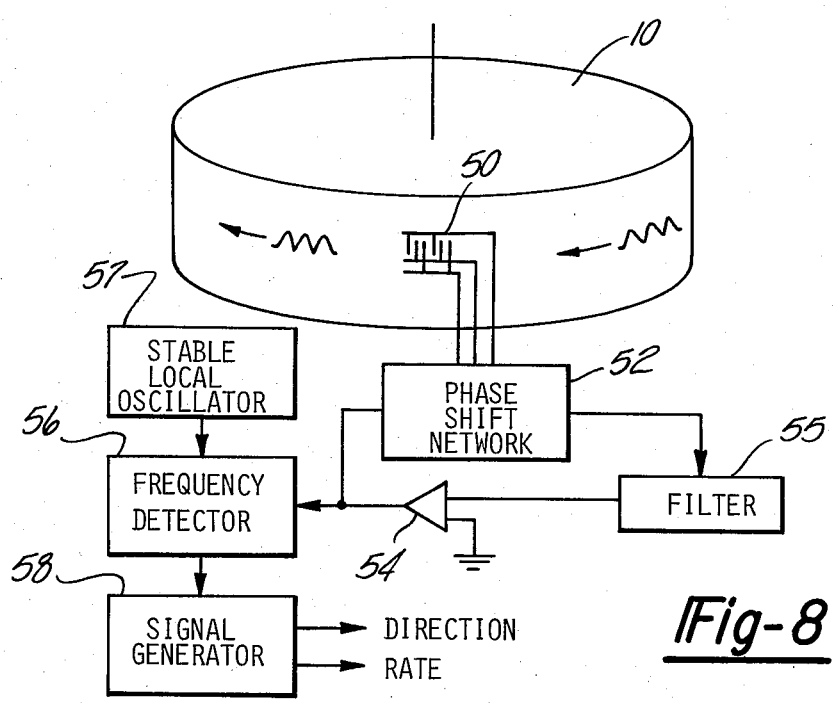
FIG. 8 is a block diagram of a third embodiment of the surface acoustic wave gyroscope using a single transducer.

Referring now to FIG. 8, there is shown another embodiment utilizing a single unidirectional interdigital transducer 50 having an associated phase shift network 52. The output signal from phase shift network 52 is connected to the input of an amplifier 54. Narrow band-pass filter 55 insures that the frequency of the detected surface acoustic wave does not mode—jump and that the wavelength is a fixed interger fraction of the circumference C of the substrate for all times. The output of the amplifier 54 is connected back to the input to the phase shift network 52 and to a frequency detector 56 of the same type as described with reference to FIG. 7. The frequency detector may also receive a reference signal from a local stable oscillator 57 as previously described. The output of the frequency detector 56 is connected to a signal generator 58 which outputs the direction and rotational rate signals as previously discussed.

In this embodiment, the single transducer 50 transmits a surface acoustic wave which propagates around the surface of the substrate 10. Because transducer 50 is unidirectional it also detects the surface acoustic wave after it has propagated completely around the substrate 10. The signal present at transducer 50 is a composite of the transmitted wave and the detected wave. This composite signal is fed back into the input of a amplifier 54 as a feedback signal through the phase shift network 52. When the substrate is not rotating, the transmitted and detected wave are in phase and the circuit comprising amplifier 54, phase shift network 52, transducer 50 and the propagation of the surface acoustic wave around the substrate 10 functions as a regenerative oscillator which oscillates at a frequency such that the input and output signals of amplifier 54 are in phase. Rotation of the substrate 10 changes the propagation velocity of the surface acoustic wave causing the detected wave to be out of phase with the transmitted wave. The out-of-phase detected wave when combined with the transmitted wave produces a composite wave phase shifted towards the phase of the detected wave. The phase shifted composite wave causes the resonant frequency of the oscillator circuit to change until the detected surface acoustic-wave is again in phase with the transmitted wave. The operation of this circuit corresponds to the convential crystal controlled oscillator in which a resonant surface acoustic wave is used in place of a resonant bulk wave.

The frequency detector 56 and signal generator 58 perform the same circuit function as their counterparts 42, and 44 described with reference to FIG. 7.

Figure 9:
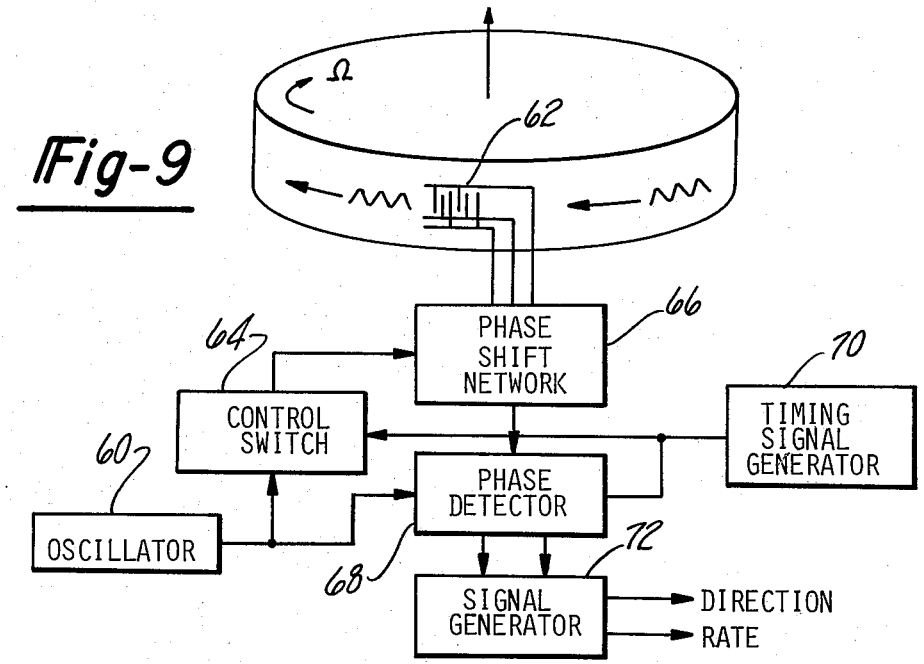
FIG. 9 is block diagram for an alternate embodiment of the single transducer surface acoustic wave gyroscope.

Another embodiment of the surface acoustic wave gyroscope using a single unidirectional transducer and associated phase shift network are illustrated in FIG. 9. In this embodiment, an oscillator 60 generates an oscillator signal having a frequency such that when the substrate 10 is not rotating, the wave detected by transducer 62 is in phase with the wave being generated. The output of oscillator 60 is transmitted to the transducer 62 through a control switch 64 and a phase shift network 66, and directly to a phase detector 68. The output of the phase shift network 66 is transmitted directly to phase detector 68.

A timing signal generator 70 generates a first timing signal disabling phase detector 68 and enabling control switch 64 to transmit the signal received from the oscillator 60 to the phase shift network 66 activating the transducer 62 to generate a surface acoustic wave.

The duration of the first timing signal is selected such that the leading edge of the generated surface acoustic-wave will propagate completely around the circumference of the substrate 10 and be detected by transducer 62. At the end of the first signal, the signal generator 70 generates a second timing signal which disables control switch 64, terminating the transmission of signal generated by oscillator 60 to the phase shift network 66 and activating phase detector 68. During the time period of the second timing signal the phase detector 68 generates a first signal indicative of the phase relationship between the phase of the surface acoustic wave detected by transducer 62 and the phase of the signal being generated by oscillator 60 and a second signal indicative of the magnitude of the phase difference between these two signals. Signal generator 72 responds to these two signals and generates the direction and rate signals as previously discussed.

Figure 10:
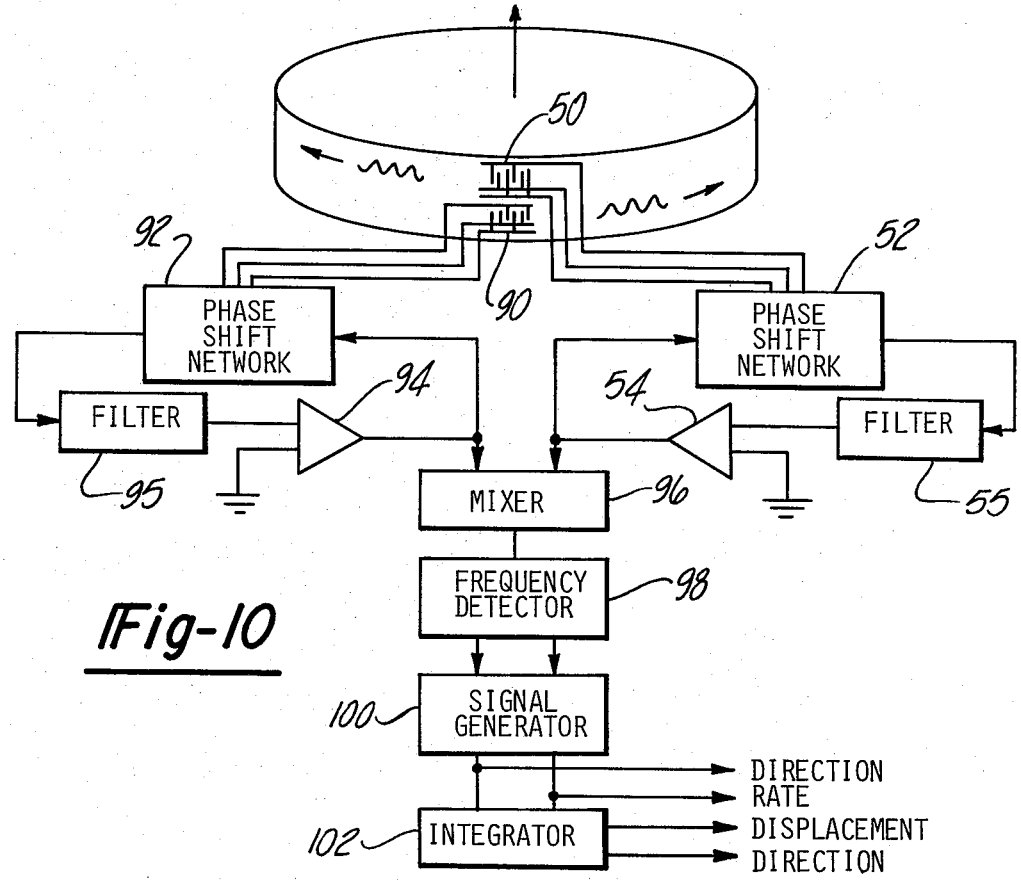
FIG. 10 is a block diagram of a dual surface acoustic wave gyroscope.

FIG. 10 shows an alternate embodiment of the embodiment shown on FIG. 8 having two unidirectional transducers generating surface acoustic waves in opposite directions around the cylindrical substrate 10.

As previously discussed amplifier 54, band pass filter 55 phase shift network 52 and transducer 50 comprise a first resonant oscillator generating an output signal having a frequency dependant upon the direction of rotation and rotational velocity of the substrate 10. In a like manner amplifier 94, band pass filter 95 phase shift network 92 and transducer 90 comprise a second resonant oscillator generating an output signal also having a frequency dependant upon the direction of rotation and rotational velocity of the substrate 10. Because the two surface acoustic waves are traveling in opposite directions, the frequencies of the two resonant oscillator circuits will change in opposite direction in response to a rotation of the substrate, i.e. one will increase and the other decrease and vice versa. Frequency changes in the two oscillators due to changes in the propagation velocities of the surface acoustic waves due to temperature, mechanical strain, aging etc, however will be in the same direction rendering this configuration of the gyroscope insensitive to these factors.

The output frequencies of the two oscillator circuits are received by a mixer 96 which generates a first signal having a frequency indicative of the difference the two frequencies and a second signal indicative of which oscillator is producing the signal with the higher frequency. The signals are received by a signal generator 100 which outputs the direction and rate signals. The output of the signal generator 100 may also be received by an integrator to produce a displacement or altitude signal indicative of the total angular displacement of the substrate 10 from its initial position and a direction signal indicative of the direction of the total angular displacement.

It is recognized there are other ways in which the change in the propagation velocity of the surface acoustic wave due to rotation may be detected to determine a rotational rate or velocity of the propagation medium without departing from the spirit of the invention. Therefore it is not intended that the invention be limited to the several embodiments described and illustrated herein.

What is claimed is:

1. A surface acoustic wave gyroscope comprising:
a substrate having an axis of rotation and a surface displaced from and parallel to said axis of rotation;
first means for generating at least one surface acoustic wave traversing said surface of said substrate with a wave particle motion in a plane normal to said axis;
direction signal means for generating a first direction signal indicative of the direction of said rotation in response to the propagation velocity of said surface acoustic wave; and
rate signal means for generating a rate signal indicative of the rotational velocity of said substrate relative to said axis in response to the propagation velocity of said surface acoustic wave.

2. The gyroscope of claim 1 further including displacement means for generating a displacement signal indicative of the total angular displacement of said substrate from an initial position and a second direction signal indicative of the direction of said total angular displacement in response to said first direction and rate signals.

3. The gyroscope of claims 1 or 2 wherein said first means generates two surface acoustic-waves traversing said surface of said substrate in opposite directions with wave particle motion normal to said axis and said direction signal means and said rate signal means are responsive to the difference in the propagation velocities of said two surface acoustic waves.

4. The gyroscope of claim 1 wherein said first means includes:
oscillator means generating an oscillator signal; and
first transducer means disposed on the surface of said substrate for generating said surface acoustic waves in response to said oscillator signal.

5. The gyroscope of claim 4 wherein said oscillator means generates said oscillator signal having a fixed frequency, said direction signal means and said rate signal means comprise:
second transducer means for detecting said surface acoustic wave at a location displaced from said first transducer means to generate a detected signal; and
means for generating said first direction signal and said rate signal in response to the phase difference between said oscillator signal and said detected signal.

6. The gyroscope of claim 5 wherein said means for generating said first direction and rate signals comprises:
phase detector means responsive to said oscillator and detected signals for generating a polarity signal indicative of the phase polarity between said oscillator and detected signals and a magnitude signal indicative of the phase difference between said oscillator and detected signals; and
first signal generator means responsive to said polarity and magnitude signals for generating said first direction signal indicative of the direction of rotation of said substrate, and said rate signal indicative of the rotational velocity of said substrate.

7. The gyroscope of claim 6 further including displacement signal generator means for generating displacement signals indicative of the direction and total angular displacement of said substrate from an initial position in response to said first direction and rate signals.

8. The gyroscope of claims 6 or 7 wherein said phase detector means includes a delay network for delaying the phase of said oscillator signal to generate a delayed oscillator signal so that the phase of the delayed oscillator signal is in phase with the detected signal when said substrate is not rotating.

9. The gyroscope of claim 4 wherein said oscillator is a phase locked loop circuit, said direction signal means and said rate signal means comprise:
a second transducer means disposed on said substrate for detecting the surface acoustic wave at a location remote from said first transducer means to generate a feedback signal to said phase locked loop circuit, said feedback signal causing said phase locked loop circuit to oscillate at a frequency maintaining a predetermined phase relationship between the oscillator signal and the feedback signals;
frequency detector means for detecting the oscillation frequency of said phase locked loop circuit to generate a direction signal indicative of the direction which the frequency of the oscillator signal changed in response to the rotation of said substrate and a magnitude signal indicative of the magnitude of the change in frequency of said oscillator signal in response to the rotation of said substrate; and signal generator means for generating said first direction signal indicative of the direction said substrate is rotating and said rate signal indicative of the rotational velocity of said substrate in response to said direction and magnitude signals.

10. The gyroscope of claim 9 further including displacement signal generator means for generating displacement signals indicative of the total angular displacement of said substrate from an initial position and the direction of said displacement in response to said second direction signal and said rate signal.

11. The gyroscope of claims 9 or 10 wherein said substrate is a cylinder having a circumference C, said first and second transducer means are unidirectional interdigital transducers displaced one above the other in a direction parallel to said axis and said phase locked loop circuit oscillates at a frequency which produces a surface acoustic wave having a wavelength on the surface of said substrate when said substrate is not rotating, and where said wavelength is related to said circumference in accordance with the relationship $$N\lambda = C$$

where N is an interger.

12. The gyroscope of claim 4 wherein said substrate is a cylinder and said first transducer means further detects the generated surface acoustic wave after it has propagated around the surface of said substrate to generate a feedback signal having a phase which is a composite of the generated and detected surface acoustic wave; and wherein said oscillator means in response to said feedback signal oscillates at a resonant frequency determined by a predetermined phase relationship between said oscillator and feedback signals.

13. The gyroscope of claim 11 wherein said substrate has a circumference C and the surface acoustic wave has a propagation velocity "v", the resonant frequency "f" of said oscillator means is given by $$f = NV/C$$

where N is an interger whereby a change in the propagation velocity V of the surface acoustic wave due to a rotation of the substrate will cause a proportional change in the resonant frequency of said oscillator means.

14. The gyroscope of claim 13 wherein said interger N is kept fixed for all times said oscillator means further includes a narrow band-pass filter to prevent said oscillator means from mode-jumping.

15. The gyroscope of claim 13 further including means for generating said first a direction signal indicate of the direction in which the substrate is rotating and said rate signal indicative of the rotational velocity of the substrate in response to the frequency of said oscillator signal.

16. The gyroscope of claim 15 further including means for integrating said direction and rate signals to generate a displacement signal indicative of the total angular displacement of said substrate from an initial position and a displacement direction signal indicative of the direction of said total angular displacement.

17. The gyroscope of claim 12 further including means for generating a displacement signal indicative of the total angular displacement of said substrate from an initial position and a displacement direction signal indicative of the rotational direction of said total angular displacement in response to the frequency of said oscillator signal.

18. The gyroscope of claim 1 wherein said first means comprises:

a first resonant oscillator generating a first oscillator signal in response to a first feedback signal;

first unidirectional transducer means for generating a first surface acoustic wave propagating in a first direction around the cylindrical surface of said substrate in a plane normal to said axis in response to said first oscillator signal, and for detecting said first surface acoustic wave after propagating around the surface of said substrate to generate said first feedback signal;

second resonant oscillator means for generating a second oscillator signal in response to a second feedback signal; and second unidirectional transducer means for generating a second surface acoustic wave propagating in a second direction, opposite said first direction, around the cylindrical surface of said substrate in response to said second oscillator signal, and for detecting said second surface acoustic wave after propagating around the surface of said substrate to generate said second feedback signal, and wherein said first and second oscillator signals are indicative of the propagation velocities of said first and second surface acoustic waves.

19. The gyroscope of claim 18 wherein said first and second resonant oscillators oscillate at essentially the same frequency when the substrate is not rotating.

20. The gyroscope of claim 18 wherein said directional signal and rate signal means includes means responsive to the change in frequency of said first and second oscillator signals due to a rotation of said substrate for generating said rate signal indicative of the rotational velocity of said substrate and said first directional signal indicative of the direction in which said substrate is rotating.

21. The gyroscope of claim 20 further including integrator means for integrating said rate and direction signals to generate an attitude signal indicative of the total angular displacement of said substrate from an initial position and a displacement directional signal indicative of the direction of said total angular displacement.

22. A method for measuring the rotation of a substrate about an axis comprising the steps of:

generating at a first location on the surface of the substrate at least one surface acoustic wave propagating along the surface of the substrate in a plane normal to the axis;

detecting said surface acoustic wave at a second location on the surface of said substrate displaced from said first location along the propagation path of said surface acoustic wave to generate a detected signal;

detecting the change in the phase of said detected signal due to the rotation of said substrate to generate a phase signal having a polarity component indicative of the direction of change in the surface acoustic wave's propagation velocity and a magnitude component indicative of the magnitude in the change in the surface acoustic wave's propagation velocity;

processing the polarity component of said phase signal to generate a first direction signal indicative of the direction in which the substrate is rotating; and processing the magnitude component of said phase signal to generate a rate signal indicative of the rotational velocity of the substrate.

23. The method of claim 22 further including the step of integrating said rate signal and first direction signal to generate an attitude signal indicative of the total angular displacement of the substrate from an initial position and a second direction signal indicative of the rotational direction of said total angular displacement.

24. The method of claim 22 wherein said phase signal has a polarity component indicative of the direction of the change in the surface acoustics waves propagation velocity and an angular component indicative of the magnitude in the change in the surface acoustic waves' propagation velocity, said method further includes the step of integrating the polarity and angular components of said phase signal to generate an attitude signal indicative of the total angular displacement of the substrate from an initial position and a directional signal indicative of the rotational direction of said total angular displacement.

25. The method of claim 22 wherein said step of generating a surface acoustic wave comprises the steps of:
energizing a first unidirectional surface acoustic wave transducer with an oscillating signal to produce said surface acoustic wave;
detecting said surface acoustic wave after it has propagated a predetermined distance "d" across the surface of said substrate to generate a feedback signal;
inputting said feedback signal into amplifier means to generate said oscillating signal having a frequency maintaining a predetermined phase relationship between said oscillating signal and said feedback signal.

26. The method of claim 25 wherein the propagation velocity of said surface acoustic wave changes as a function of the rotational velocity of said substrate and wherein a change in the propagation velocity of said surface acoustic wave causes a corresponding change in the frequency of said oscillating signal to maintain said predetermined phase relationship, said step of detecting the change in the phase detects the change in the frequency of said oscillating signal.

27. The method of claim 26 wherein said step of detecting the change in the phase includes the step of:
detecting the frequency of said oscillating signal to generate said phase signal having a polarity component indicative of the direction of the change in the frequency of the oscillating signal from a reference frequency and a magnitude component having a value indicative of the magnitude in the change of the frequency of said oscillating signal with respect to said reference frequency.

28. The method of claim 27 further including the step of integrating said rate and first directional signals to generate signals indicative of the total angular displacement of said substrate from an initial position and indicative of the rotational direction of said total angular displacement.

29. The method of claim 26 wherein said step of detecting the change in the phase includes the steps of:
detecting the frequency of said oscillating signal to generate said phase signal having a polarity component indicative of the direction of the change in the frequency of the oscillating signal from a reference signal and a magnitude component having a value indicative of the magnitude in the change in the frequency of said oscillating signal with respect to said reference frequency; and
integrating the polarity and magnitude components of said phase signal to generate signals indicative of the total angular displacement of said substrate from an initial position and the direction of said total angular displacement.

30. The method of claims 27 or 28 wherein said reference frequency is the frequency of said oscillating signal when the substrate is not rotating.

31. The method of claim 22 wherein said step of generating at least one surface acoustic wave, generates two surface acoustic waves propogating across the surface of the cylindrical substrate in opposite directions and said step of detecting the change in the phase detects the change in the phase between said two surface acoustic waves to generate said phase signal characteristic of the rotation of the substrate.

32. The method of claim 31 wherein said step of generating said two surface acoustic wave comprises the steps of:
energizing a first unidirectional surface acoustic wave transducer with a first oscillating signal to produce a first surface acoustic wave propagating across the surface of the substrate in a first direction;
detecting said first surface acoustic wave after it has propagated a predetermined distance across the surface of the substrate to generate a first feedback signal;
inputing said first feedback signal into a first amplifier means to generate said first oscillating signal having a first frequency maintaining a predetermined phase relationship between said first oscillating signal and said first feedback signal
energizing a second unidirectional surface acoustic wave transducer with a second oscillating signal to produce a second surface acoustic wave propagating across the surface of the substrate in a second direction opposite from said first direction
detecting said second surface acoustic wave after it has propagated a predetermined distance across the surface of the substrate to generate a second feedback signal;
inputing said second feedback signal into a second amplifier means to generate said second oscillating signal having a second frequency maintaining a predetermined phase relationship between said second oscillating signal and said second feedback signal.

33. The method of claim 32 wherein the propagation velocities of said first and second surface acoustic waves change as a function of the rotational velocity of the substrate and cause corresponding changes in the frequencies of said first and second oscillating signals to maintaining said predetermined phase relationships, said step of detecting the change in the phase detects the difference between said first and second frequencies.

34. The method of claim 33 wherein said step the detecting the difference between said first and second frequencies includes the steps of:
comparing said first and second frequencies to generate a first signal indicating which of the oscillating signals have the higher frequency; and
subtracting said first frequency from said second frequency to generate a second signal indicative of the frequency difference between said two oscillating signals.

35. The method of claim 34 further including the steps of processing said first and second signals to generate signals indicative of the rotational velocity and direction of rotation of the substrate.

36. The method of claim 34 or 35 further including the step of integrating said first and second signals to generate signals indicative of the total angular displacement of the substrate from an initial position and indicative of the direction of said total angular displacement.

37. The method of claim 32 wherein said substrate is a cylinder said steps of detecting said first and second surface acoustic waves detect said first and second acoustic waves after they have propagated at least once around the surface of said cylindrical.

38. A surface acoustic wave gyroscope comprising:
a substrate having an axis of rotation and a surface displaced from and parallel to said axis of rotation;
first means for generating at least one surface acoustic wave traversing said surface of said substrate with wave particle motion in a plane normal to said axis;
second means for generating signals indicative of the direction of rotation in response to the propagation velocity of said surface acoustic wave; and
third means for generating signals indicative of the total angular displacement of said substrate from an initial position in response to the propagation velocity of said surface acoustic wave.

39. The gyroscope of claim 38 wherein said first means generates two surface acoustic waves traversing the surface of said substrate in opposite direction with wave particle motion in a plane normal to said axis and wherein said second and third means generate said signals in response to the difference between the propagation velocities of said two surface acoustic waves.

* * * * *